US009621360B2

(12) United States Patent
Rittenhouse et al.

(10) Patent No.: US 9,621,360 B2
(45) Date of Patent: Apr. 11, 2017

(54) SYSTEM AND METHOD FOR ANALYZING NETWORK POWER CONSUMPTION

(75) Inventors: George Endicott Rittenhouse, Holmdel, NJ (US); Gary Weldon Atkinson, Freehold, NJ (US); Oliver Blume, Stuttgart (DE); Suresh Goyal, Warren, NJ (US); Daniel Charles Kilper, Fair Haven, NJ (US); Steven Kenneth Korotky, Toms River, NJ (US); Dusan Suvakovic, Pleasanton, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1407 days.

(21) Appl. No.: 13/011,487

(22) Filed: Jan. 21, 2011

(65) Prior Publication Data

US 2011/0182198 A1 Jul. 28, 2011

Related U.S. Application Data

(60) Provisional application No. 61/336,489, filed on Jan. 22, 2010.

(51) Int. Cl.
*H04L 12/26* (2006.01)
*H04L 12/28* (2006.01)
*H04L 12/12* (2006.01)

(52) U.S. Cl.
CPC ............. *H04L 12/12* (2013.01); *Y02B 60/34* (2013.01); *Y02B 60/42* (2013.01)

(58) Field of Classification Search
USPC .................... 370/252; 709/226; 455/186.1
See application file for complete search history.

(56) References Cited

U.S. PATENT DOCUMENTS

| | | | | |
|---|---|---|---|---|
| 5,930,147 | A | * | 7/1999 | Takei .............................. 716/104 |
| 6,115,823 | A | * | 9/2000 | Velasco et al. ................ 713/322 |
| 6,321,168 | B1 | * | 11/2001 | Shimazaki ....................... 702/60 |
| 7,623,758 | B2 | * | 11/2009 | Cho et al. ....................... 386/248 |
| 7,782,829 | B2 | * | 8/2010 | Miao et al. ..................... 370/344 |
| 8,521,476 | B2 | * | 8/2013 | Tung ........................ G06F 1/206 |
| | | | | 702/188 |
| 2007/0295590 | A1 | * | 12/2007 | Weinberg et al. .............. 201/17 |
| 2008/0127001 | A1 | * | 5/2008 | Tamaki et al. ..................... 716/2 |

(Continued)

OTHER PUBLICATIONS

Jayant Baliga, Robert Ayre, Kerry Hinton, Wayne V. Sorin, Energy Consumption in Optical IP Networks, Journal of Lightwave Technology, vol. 27, No. 13, Jul. 1, 2009.*

*Primary Examiner* — Edan Orgad
*Assistant Examiner* — Emmanuel Maglo
(74) *Attorney, Agent, or Firm* — Kramer & Amado, P.C.

(57) ABSTRACT

A system and method for analyzing network power consumption is disclosed. The system and method for analyzing network power consumption includes the steps of specifying at least one service which will run on said network; defining a plurality of resources provisioned in the network, each having an associated power efficiency; associating a network path with the service; calculating a sum of the power efficiencies for the resources of the network path; and outputting the sum to a display device. The system and method for analyzing network power consumption is particularly useful for identifying power consumption efficiencies throughout a communication network.

6 Claims, 4 Drawing Sheets

(56) References Cited

U.S. PATENT DOCUMENTS

| | | | |
|---|---|---|---|
| 2008/0243403 A1* | 10/2008 | Furukawa | 702/60 |
| 2009/0088108 A1* | 4/2009 | Granlund et al. | 455/186.1 |
| 2009/0259345 A1* | 10/2009 | Kato et al. | 700/295 |
| 2010/0128432 A1* | 5/2010 | Miller | 361/679.54 |
| 2010/0205137 A1* | 8/2010 | Barsness et al. | 706/52 |
| 2012/0030356 A1* | 2/2012 | Fletcher | G06F 9/5094 709/226 |
| 2012/0198253 A1* | 8/2012 | Kato et al. | 713/320 |

* cited by examiner

SYSTEM AND METHOD FOR ANALYZING NETWORK POWER CONSUMPTION

BENEFIT OF EARLIER APPLICATION

This application claims benefit of Provisional application 61/336,489, filed Jan. 22, 2010.

ACKNOWLEDGEMENT OF GOVERNMENT SUPPORT

This invention was made with Government support under contract FA9550-08-1-0064 awarded by the US Air Force Office of Scientific Research. The Government has certain rights in the invention.

FIELD OF THE INVENTION

The invention is directed to network analysis and in particular analysis of power consumption of a specific network.

BACKGROUND OF THE INVENTION

Recently, renewed interest has been given to energy consumption in information and communication technologies (ICT). Based upon exponential traffic growth trends, inadequate business-as-usual network equipment efficiency measures are expected to lead to unsustainable power requirements in the coming decades. Today energy costs for large service providers are substantial and in the case of mobile networks, can be a large component of operational expenses. In wireline networks, the deficit between equipment efficiency improvement and capacity growth has strained thermal management capabilities in central offices and brought focus to power in the design of telecommunications equipment.

According to some estimates, the carbon footprint today for all ICT is estimated to be only 1-2% worldwide and the network equipment contribution is roughly one-third with the remaining composed of data centers, personal computers, printers and peripherals. Further, these studies have pointed to power spent for ICT as an enabler for five-fold carbon footprint reductions in other sectors of society such as transportation or in-building controls. So-called smart technologies take advantage of ubiquitous monitoring and data collection provided by ICT to better control the energy consumed by a wide range of power systems from the power grid itself to household electronics. This benefit however, is dependent on the assumption that the total power associated with ICT will only see a modest increase (doubling in 10 years) without impact on the continued growth and availability of ICT resources such as bandwidth. These estimates do not take into account details associated with the relative growth of traffic and network equipment efficiency and the report admits to a high level of uncertainty on this issue.

Several technology trends raise concerns over the ability of technology efficiency improvements to keep pace with traffic growth. Most of the power in network equipment is dissipated in the electronics and thus efficiency improvements are strongly tied to Moore's law trends. In recent years, operating voltages and consequently the CMOS switching power has not kept pace with feature size reductions. Furthermore, chip energy consumption is increasingly becoming interconnect limited rather than CMOS switching energy limited. At the same time, the transport media itself, whether wireline or wireless, is being constrained by the minimum received energy given by the Shannon channel capacity. Mobile links typically operate within 3 dB of their respective Shannon limits. Laboratory optical transmission system experiments have reached within 4 dB of the Shannon limit. As a result, network capacity gains due to increasing spectral efficiency will diminish. In the past, the dramatic growth of wireline network capacity has largely been due to efficient bandwidth scaling of the interfaces, including the use of wavelength division multiplexing (WDM). Continued network growth without this scaling would result in an exponential growth in the number of interfaces and/or spectral width and associated network power consumption.

Studies of network energy use have shown that the power is dominated by the access equipment today, although the core network equipment will draw even with increasing traffic. Additional service-dependent traffic growth trends are needed to better understand how this evolution might be engendered in a particular network.

Therefore it would be desirable to have a transaction based power consumption model that includes enterprise switching and, for the core equipment, that includes equipment energy efficiency, in order that network alterations may be assessed for their impacts on power consumption.

SUMMARY OF THE INVENTION it is an object of the invention to provide a system and method for analyzing network power consumption.

According to an aspect of the invention there is provided a method for analyzing the power consumption of a communication network, the method having the steps of: specifying at least one service which will run on the network; defining a plurality of resources provisioned in the network, each of the plurality of resources having an associated power efficiency; associating a network path with the at least one service; calculating a sum of the power efficiencies for the resources of the network path; and outputting the sum to a display device.

In some embodiments of the invention there is the further step of providing at least one over-provisioning multiplier for the at least one service; and using the at least one over-provisioning multiplier to define additional resources for the at least one service. Advantageously, in some embodiments the over-provisioning multiplier is provided for the purposes of compensating at least one of the set of peak-to-mean traffic variations, traffic growth over time, over-subscription, and protection needs.

In some embodiments there is the additional step of multiplying the sum by a factor representing a user traffic volume associated with the at least one service and outputting the product of the multiplying step to the display device.

In some embodiments of the invention the display device consists of a digital display device, in others a graphical user interface, and in yet others a printer.

According to another aspect of the invention there is provided a system for analyzing the power consumption of a communication network, the system having: a processor; a memory; the memory containing instructions executable by the processor for making: a resource database containing information describing a plurality of network equipment available for provisioning, a power efficiency database containing power efficiency information associated with the plurality of network equipment; a sub-network definition module which accepts input data from an operator interface which defines a subset of the plurality of network resources; a service definition module which accepts input data from the operator interface which defines at least one service which will be running on the network, the input data also defining which sub-network the service will traverse; making the service definition module calculate a power efficiency sum for the at least one service; and outputting the power efficiency sum.

Some embodiments of the invention include additional instructions executable by the processor for: providing at least one over-provisioning multiplier for the at least one service; and using the at least one over-provisioning multiplier to associate additional network equipment to the at least one service.

Advantageously, in some embodiments of the invention the at least one over-provisioning multiplier is provided for the purposes of compensating at least one of the set of peak-to-mean traffic variations, traffic growth over time, over-subscription, and protection needs.

Some embodiments of the invention include additional instructions executable by the processor for: multiplying the sum by a factor representing a user traffic volume associated with the at least one service; and outputting the product of the multiplying step to the display device.

According to yet another aspect of the invention there is provided a non-transitory computer-readable, tangible storage-medium storing computer instructions which when executed, enable a computer system to analyze the power consumption of a communication network, the computer instructions: specifying at least one service which will run on the network; defining a plurality of resources provisioned in the network, each of the plurality of resources having an associated power efficiency; associating a network path with the at least one service; calculating a sum of the power efficiencies for the resources of the network path; and outputting the sum to a display device.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

In the transaction-based modeling approach, the power is calculated by adding up the power of all of the resources in the network that are used to deliver a given service on a mean transaction basis. Different types and quantities of network equipment may be employed in delivering the various services and the traffic they generate.

Figure 1:
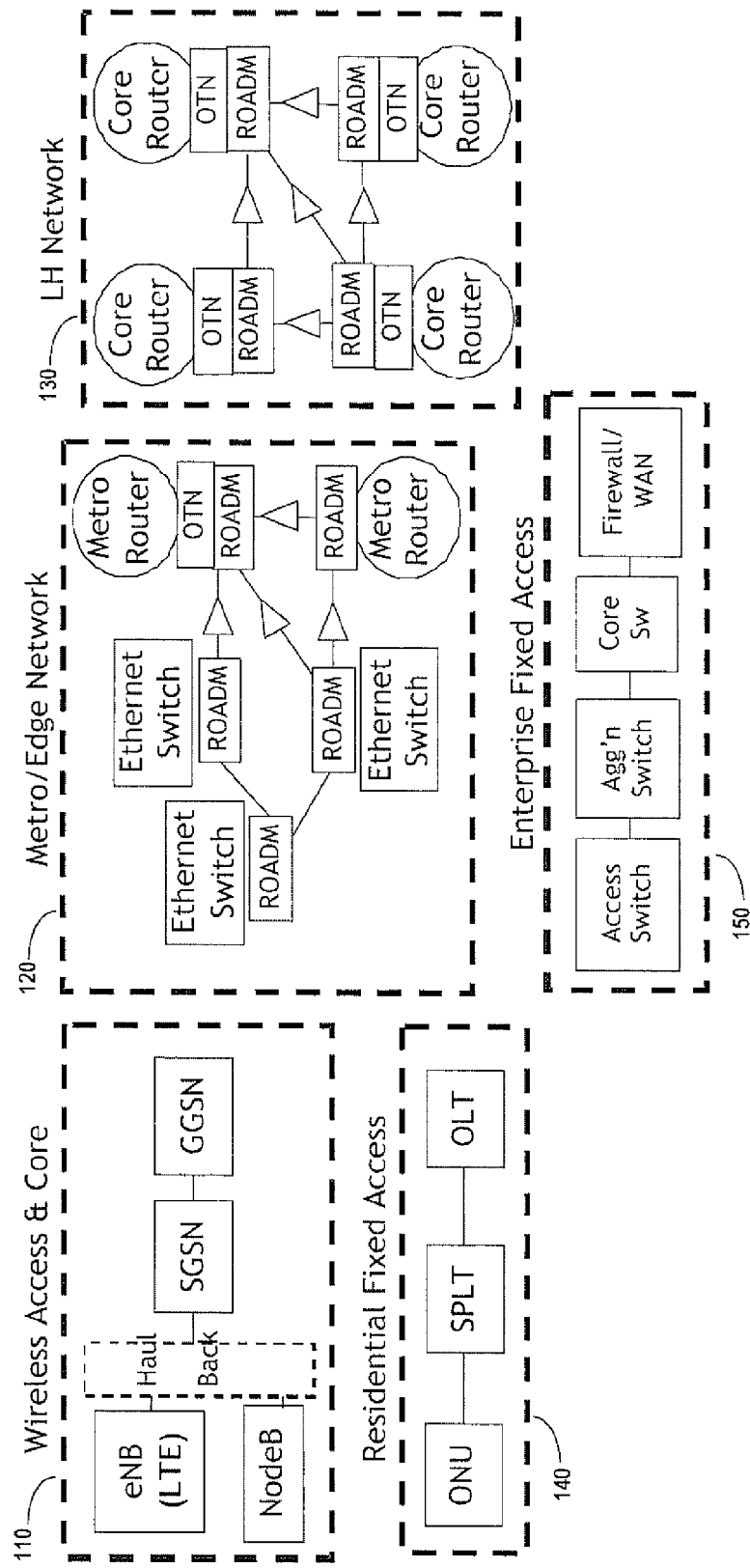
FIG. 1 is a block diagram of network equipment according to a possible embodiment of the invention.

Referring to FIG. 1 there may be seen illustrative examples of different types of sub-networks and some of the network elements contained within. At 110 there may be seen a Wireless Access and Core sub-network having eNodeB, NodeB, SGSN (Serving GPRS Support Node) and GGSN (Gateway GPRS Support Node) network elements contained therein. At 120 there may be seen a Metro/Edge sub-network having Metro Routers, Ethernet Switches, OTNs (Optical Terminal Nodes), and ROADM (Reconfigurable Optical Add/Drop Multiplexers) contained therein. At 130 there may be seen a Long Haul sub-network having core routers, OTNs, and ROADMs contained therein. At 140 there may be seen a Residential Fixed Access sub-network having ONU (Optical Network Unit), OLT (Optical Line Termination), and SPLT (Splitter) network elements contained therein. Finally, at 150 there may be seen an Enterprise Fixed Access sub-network having an access switch, aggregation switch, core switch, and Firewall/WAN (Wide Area Network) network elements therein.

The network power is determined by the energy efficiency of the network equipment and how the equipment is provisioned. For example, if equipment is provisioned for 1+1 protection, then sufficient equipment is operated to deliver twice the mean traffic. Often additional equipment is provisioned to account for diurnal and other traffic variations, as well as traffic growth over time. Equipment may also be deployed following an aggregation model allowing for over-subscription in the edge and access equipment. The provisioning model used here is given in Table 1 and varies from a factor of 10 in the central office/enterprise access equipment to a factor of 2 for the long haul core equipment. An additional factor of 2 is applied for 1+1 protection, which is indicated by the ×2 multiplier for the corresponding network equipment in which it is used.

TABLE 1

Network Provisioning Model

| Network Equipment | Factor | Notes |
|---|---|---|
| Fixed Access | 1 | CPE is provisioned with one unit per household regardless of traffic |
| Edge Aggregation | 10 × 2 | |
| Metro | 5 × 2 | |
| Long Haul | 2 × 2 | |
| Enterprise | 10 × 2 | |
| Mobile | 5 × 2 | Routing & switching hardware; BTS factor is 10 independent of protection |

Effective over-provisioning multipliers (Factor) used for each of the respective network equipment technologies to account for peak to mean traffic variations, traffic growth over time, over-subscription, and/or protection; ×2 multipliers indicate 1+1 protection.

Network path models describing each sub-network used for each of the service categories are listed in Table 2. The path model determines the type and quantity of equipment used to support the respective service. Note that in this example the mobile voice traffic is specified per caller and thus the mobile and metro/edge paths are only taken once; whereas, they are taken twice for the peer to peer traffic since the service is specified end to end. The video model represents internet video data centers situated near large fiber trunk lines and thus the metro sub-network is only included once.

TABLE 2

Network Path Model

| No. | Service | Network Path |
|---|---|---|
| 1 | General Web | Fixed Access + Metro/Edge (×2) + Long Haul + Enterprise |
| 2 | Video | Fixed Access + Metro/Edge + Long Haul + Enterprise |

TABLE 2-continued

Network Path Model

| No. | Service | Network Path |
|-----|---------|--------------|
| 3 | Peer to Peer | Fixed Access (×2) + Metro/Edge (×2) + Long Haul |
| 4 | Mobile Data | Mobile + Metro/Edge (×2) + Long Haul + Enterprise |
| 5 | Mobile Voice | Mobile + Metro/Edge + Long Haul |

The network path indicates each of the sub-networks that support a mean transaction for the corresponding service.

Each of the constituent networks in the path models are characterized by a sub-network efficiency model. Table 3 summarizes the sub-network models, for which the equipment power efficiencies, defined as the power-to-capacity ratio P/C, and related parameters are defined in Table 4 along with corresponding values for 2008. The fixed access model is written in terms of the equipment power, not the efficiency, and the capacity is given by A, the total mean wireline access traffic per user. $N_{TU}$ is the number of user terminals sharing one GPON aggregation splitter. For the purposes of evaluating optimistic, state-of-the-art estimates, only passive optical network (PON) fiber access is included here.

The metro/edge network includes both aggregation equipment and transport hardware. The transport explicitly includes both layer 2 switching and layer 3 routing along with the optical transmission. The metropolitan transport is characterized by $H_M=4$ transmission segments or hops between add drop nodes and one additional hop between processing elements that does not include transmission (e.g. inter-operator exchange locations). The transmission power is separated into a node and amplifier repeater component. The number of amplifiers (including transparent bypass) between add and drop locations for a channel in the metro network is assumed to be ½ the number of amplifiers in the long haul systems. An aggregation switch is also included at the ingress and egress points between the metropolitan and access networks. The long haul network includes $H_{LH}=3$ hops, all of which include transmission over 1500 km. This approach over-estimates the optical transmission contribution to the network power, which even in this worst case does not impact the total power due to its relatively small contribution. Here we neglect submarine equipment. The enterprise access is modeled with four stages of aggregation: an access switch, aggregation switch, core switch, and a firewall unit that performs deep packet inspection. The mobile network model includes a basestation term plus two stages of long term evolution (LTE) processing equipment. The LTE processing is often performed deep within the core network and the backhaul is accounted for using the metro/edge model.

In order to determine the basestation efficiency, we use a typical three sector macro-cell basestation with four carriers per sector as a reference or typical representative unit. Multiplying the mean power $P_{BTS}$ of this reference basestation by the total number of basestations $N_{BTS}$ in the network gives the total mean power drawn in order to serve the network. Dividing this by the total traffic (number of users $N_U$×traffic per user $T_M$) yields an efficiency of the access network that includes extra provisioning associated with area coverage requirements, traffic fluctuations over time, and traffic growth allowances. The power efficiency of the LTE processing equipment (SGSN, GGSN) is added to said efficiency to yield the efficiency of the Wireless Access & Core sub-network.

The overall network efficiency can be determined for each service by summing the appropriate network efficiency models indicated in the path model. For example, for video traffic the efficiency is given by a sum of the efficiency models 1-5 in Table 3, whereas for general web traffic the metro edge models (2 and 3) are applied twice.

TABLE 3

Sub-Network Efficiency Models

| Sub-No. | Network | Efficiency Model |
|---------|---------|------------------|
| 1 | Fixed Access | $\dfrac{P_{OLT}}{A \cdot N_{TU}} + \dfrac{P_{CPE}}{A}$ |
| 2 | Metro: Aggregation | $\eta_{pr}\eta_c \dfrac{P_{Eth}}{C_{Eth}}$ |
| 3 | Metro: Transport | $(H_M + 2)\eta_{pr}\eta_c\left(\dfrac{P_R}{C_R} + \dfrac{P_{OTN}}{C_{OTN}}\right) + H_M\eta_{pr}\eta_c\left(\dfrac{P_{TR0}}{C_{TR0}} + \dfrac{1}{2}\dfrac{P_{TR1}}{C_{TR1}}\right)$ |
| 4 | Long Haul | $(H_{LH} + 1)\eta_{pr}\eta_c\left(\dfrac{P_R}{C_R} + \dfrac{P_{OTN}}{C_{OTN}}\right) + H_{LH}\eta_{pr}\eta_c\left(\dfrac{P_{TR0}}{C_{TR0}} + \dfrac{P_{TR1}}{C_{TR1}}\right)$ |
| 5 | Enterprise Access | $\eta_{pr}\eta_c\left(\dfrac{P_{AS}}{C_{AS}} + \dfrac{P_{AgS}}{C_{AgS}} + \dfrac{P_{CS}}{C_{CS}} + \dfrac{P_{FW}}{C_{FW}}\right)$ |
| 6 | Mobile | $\dfrac{P_{BTS}N_{BTS}}{N_U T_M} + \eta_{pr}\eta_c\left(\dfrac{P_{PGW}}{C_{PGW}} + \dfrac{P_{SGW}}{C_{SGW}}\right)$ |

The above efficiency models are used to calculate the total power efficiency of the network equipment supporting the services listed in Table 2. See Table 4 for examples of equipment efficiency parameters (i.e. respective power/capacity, P/C). A is the mean access rate; $\eta_C=2$ is an additional factor to account for the energy consumption of the cooling and facilities power in telecom centers; $\eta_{pr}$ is the provisioning factor given in Table 1 for each respective network; $H_M$ is the metro network transmission hops; $H_{LH}$ is the long haul transmission hops. In the Efficiency Model column of Table 2, CPE does not include CATV; one metro hop is taken to be an inter-carrier exchange point with no transmission between routing equipment; and the Mobile network is assumed to be an LTE model with converged voice and data wherein $T_M$ is a reference wireless access rate per user.

Multiplying each efficiency term by the corresponding user traffic volume provides the total power-per-user for the network. Here, a user corresponds to a household, the number of which is a relatively constant value in developed nations. Summing over all services provides the network efficiency and power.

Network Equipment Data

Equipment efficiencies and associated parameters for a reference year (2008) are listed in Table 4. The enterprise access and mobile SGW and PGW equipment efficiencies are based upon typical equipment configurations representative of the industry. The WDM equipment corresponds to a 1500 km line system. The number of basestations in 2008 is given by a CTIA industry survey. Other sources are described in the text.

TABLE 4

Example Equipment Efficiencies

| Quantity | Value | Units |
| --- | --- | --- |
| Core Router, $P_R/C_R$ | 0.0126 | W/Mb/s |
| Ethernet Switch, $P_{Eth}/C_{Eth}$ | 0.008 | W/Mb/s |
| OTN Switch, $P_{OTN}/C_{OTN}$ | 0.0035 | W/Mb/s |
| GPON OLT, $P_{OLT}$ | 19.2 | W |
| GPON CPE, $P_{CPE}$ | 10.68 | W |
| GPON Users, $N_{TU}$ | 32 | |
| Basestation, $P_{BTS}$ | 2.2096 | kW |
| Number of Basestations, $N_{BTS}$ | $2.4 \times 10^5$ | |
| Number of Users (households), $N_u$ | $10^8$ | |
| Serving Gateway, $P_{SGW}/C_{SGW}$ | 0.075 | W/Mb/s |
| Packet Gateway, $P_{PGW}/C_{PGW}$ | 0.075 | W/Mb/s |
| WDM OA line system, $P_{TR1}/C_{TR1}$ | 0.00118 | W/Mb/s |
| WDM Node, $P_{TRO}/C_{TRO}$ | 0.0047 | W/Mb/s |
| ENT Access Switch, $P_{AS}/C_{AS}$ | 0.00038 | W/Mb/s |
| ENT Core Switch, $P_{CS}/C_{CS}$ | 0.0026 | W/Mb/s |
| ENT Aggregation Switch, $P_{AgS}/C_{AgS}$ | 0.0017 | W/Mb/s |
| Firewall, $P_{FW}/C_{FW}$ | 0.3 | W/Mb/s |

Figure 2:
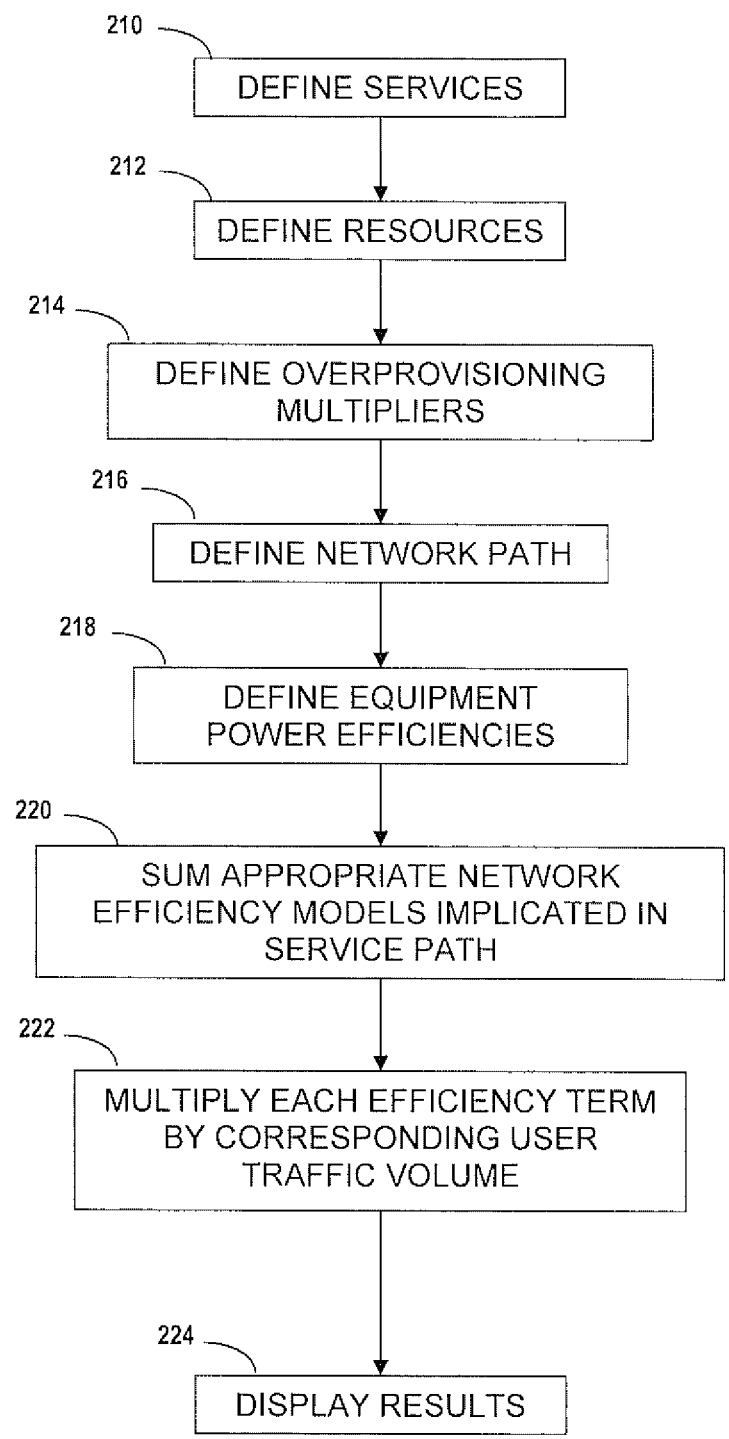
FIG. 2 is a flow diagram of a method of analyzing the power consumption of a defined network of services according to an embodiment of the invention.

Referring to FIG. 2 there may be seen a flow diagram of a method of analyzing the power consumption of a defined network of services according to an embodiment of the invention. This method follows the procedure described in the preceding discussion.

Commencing at step 210, network services are initially defined. At step 212, network resources are defined. These resources comprise the network equipment provisioned in the network under analysis. At step 214 over-provisioning multipliers are defined for each service. As discussed above, these multipliers are defined to account for peak-to-mean traffic variations, traffic growth over time, over-subscription, and protection needs.

At step 216, network paths are defined for each service. The path definition determines the type and quantity of equipment used to support the respective service. At step 218 equipment power efficiencies are defined, and then at step 220 a sum is calculated, for each service, of the appropriate sub-network efficiencies along the path defined at step 216 for the service.

At step 222, each efficiency sum is multiplied by the corresponding user traffic volume for that service. Finally, at step 224 analysis results are made available via a display. The analysis results can include such findings as: the total power per user for the network, the network efficiency and power summed over all services, the sum per service, and the sum per sub-network.

The analysis results may be displayed numerically or via a graphical user interface. If a graphical user interface is used, a display showing a diagram of network topology can have the analytical findings overlaid, either via numerical values or via graphical means such as varying color, for each of the sub-networks. The analytical results may allow an operator to identify overall network areas on which to concentrate power reduction efforts.

Figure 3:
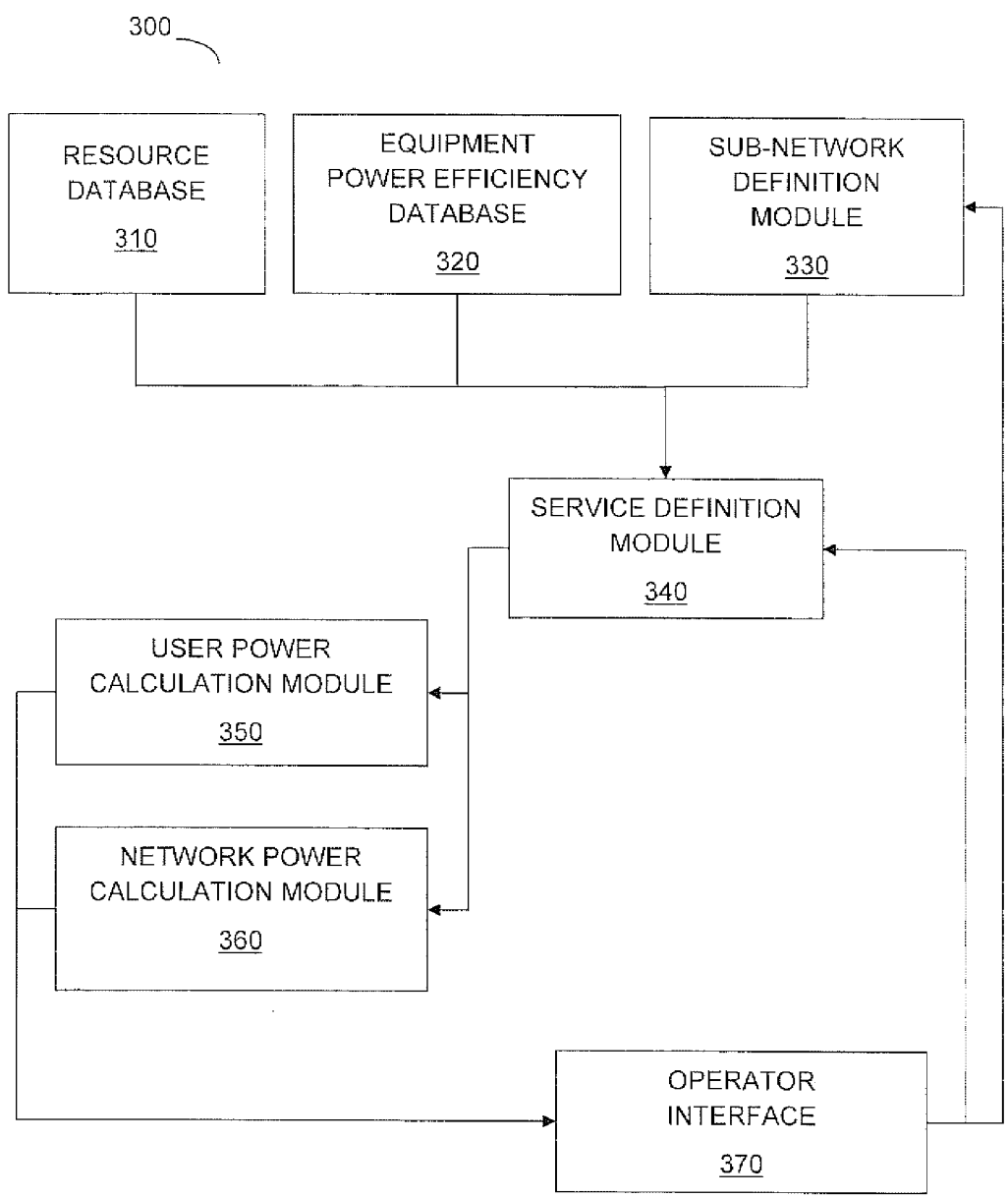
FIG. 3 is a functional block diagram of a power consumption analysis system according to an embodiment of the invention.

Referring now to FIG. 3, there may be seen a functional block diagram of a power consumption analysis system 300 according to an embodiment of the invention. Resource database 310 contains information describing the network equipment available for provisioning, while equipment power efficiency database 320 contains reference information concerning the power efficiencies of specific network equipment elements. Sub-network definition module 330 accepts input from operator interface 370 which defines the network resources within a particular sub-network. Service definition module 340 also accepts input from operator interface 370 which defines the services which will be running on the network under analysis, as well as further operator input regarding over-provisioning multipliers, the path of sub-networks traversed by each service, and the user traffic volume for each service. The service definition module then combines these inputs with information from resource database 310 and equipment power efficiency database 320 to calculate power efficiency sums for each service.

User power calculation module 350 then uses the outputs from the service definition module 330 to calculate user power, while network power calculation module 360 uses outputs from the service definition module 330 to calculate various network powers such as sum of power for overall services, sum of power per service, and sums for each sub-network. Both user power calculation module 350 and network power calculation module 360 provide results arising from their calculations to operator interface 370 for display in either number or graphical or combination form.

Figure 4:
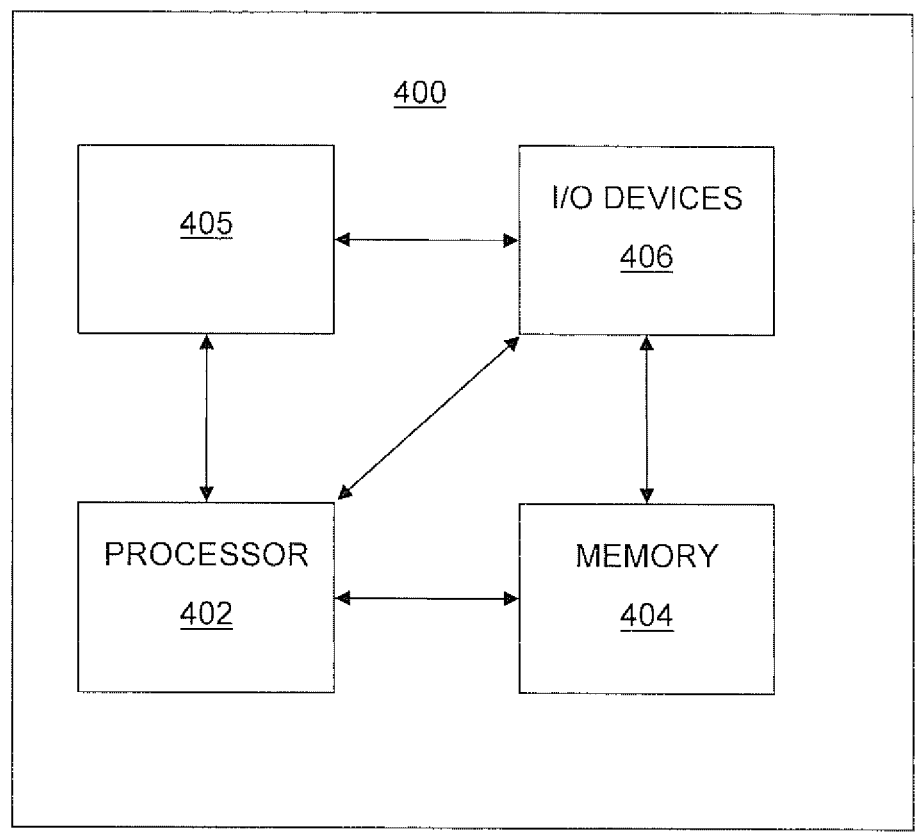
FIG. 4 is a high-level block diagram of a computer suitable for use in performing functions described herein.

Referring now to FIG. 4, computer 400 includes a processor element 402 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 405 can be loaded into memory 404 and executed by processor 402 to implement the functions as discussed herein. Thus, cooperating process 405 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal-bearing medium, and/or stored within a memory within a computing device operating according to the instructions.

In summary, a method and system have been disclosed which provides a means for analyzing the power consumption of a network.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. A system for analyzing power consumption of a communication network, the system comprising:
    a processor;
    a memory, said memory containing instructions executable by said processor;
    a resource database containing information describing a plurality of network equipment available for provisioning,
    a power efficiency database containing power efficiency information associated with said plurality of network equipment;
    a sub-network definition module which accepts input data from an operator interface which defines a subset of the plurality of network resources; and
    a service definition module which accepts input data from said operator interface which defines at least one service which will be running on said network, said input data also defining which sub-network said service will traverse, wherein said service definition module is configured to calculate a power efficiency sum for said at least one service and output analysis results based upon said power efficiency sum.

2. The system of claim 1, further comprising:
    instructions executable by said processor for providing at least one over-provisioning multiplier for said at least one service, wherein said at least one over-provisioning multiplier is configured to associate additional network equipment to said at least one service.

3. The system of claim 1, further comprising:
    instructions executable by said processor for multiplying said sum by a factor representing a user traffic volume associated with said at least one service to produce a product, wherein the product is output to said display device.

4. The system of claim 1, wherein said display device comprises one of a digital display device, a graphical user interface, and a printer.

5. The system of claim 2, wherein said at least one over-provisioning multiplier is configured to compensate at least one of peak-to-mean traffic variations, traffic growth over time, over-subscription, and protection needs.

6. A non-transitory medium storing computer instructions which when executed, enable a computer system to analyze power consumption of a communication network, the computer instructions comprising:
    instructions for specifying at least one service which will run on said network;
    instructions for defining a plurality of resources provisioned in said network, each of said plurality of resources having an associated power efficiency;
    instructions for associating a network path with said at least one service;
    instructions for calculating a sum of the power efficiencies for the resources of the network path; and
    instructions for outputting analysis results based upon said sum to a display device.

* * * * *